E. P. STACK.
COUPLING LINK FOR ENGINES.
APPLICATION FILED NOV. 12, 1913.
1,124,966.
Patented Jan. 12, 1915.
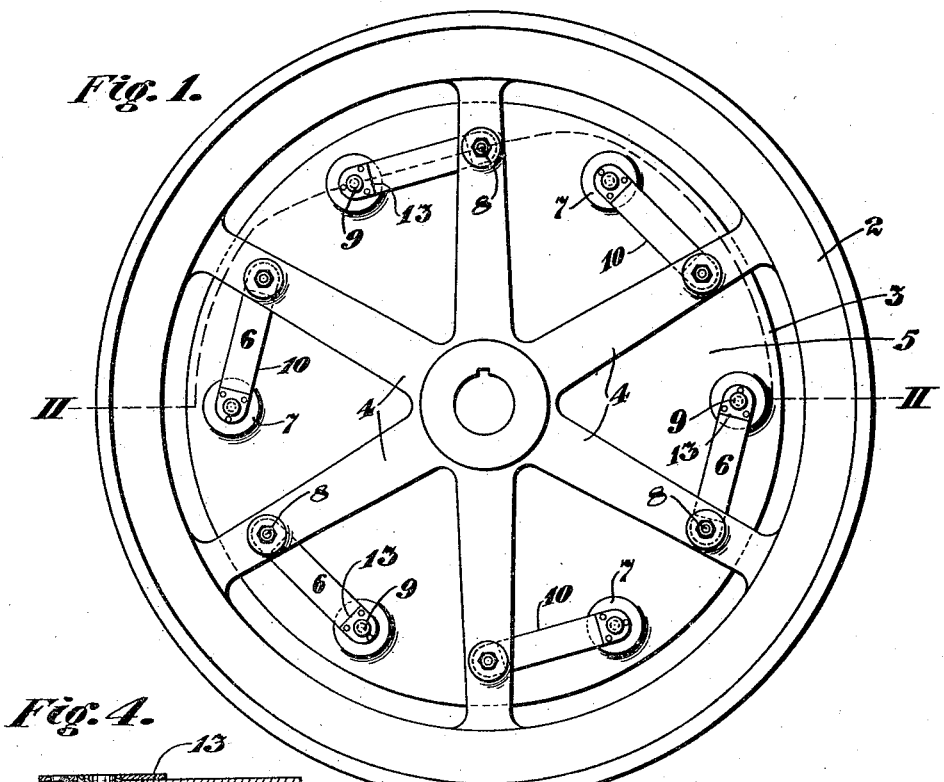
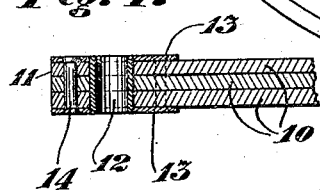
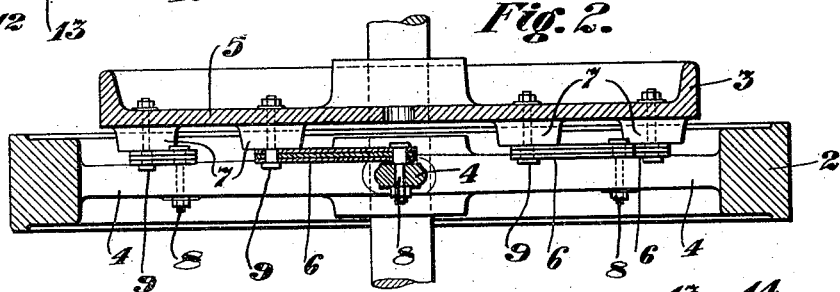
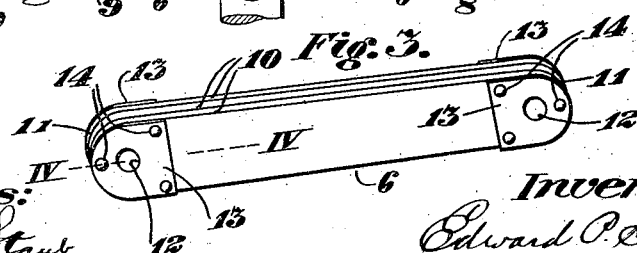
Witnesses:
Inventor:
Edward P. Stack

UNITED STATES PATENT OFFICE.

EDWARD P. STACK, OF PITTSBURGH, PENNSYLVANIA.

COUPLING-LINK FOR ENGINES.

1,124,966.  Specification of Letters Patent.  Patented Jan. 12, 1915.

Application filed November 12, 1913.  Serial No. 800,533.

*To all whom it may concern:*

Be it known that I, EDWARD P. STACK, a citizen of the United States, residing at Pittsburgh, in the county of Allegheny and State of Pennsylvania, have invented certain new and useful Improvements in Coupling-Links for Engines, of which the following is a specification.

My invention consists of an improvement in flexible coupling mechanism for connecting a rotatable driver or prime mover to a driven element, and is particularly adapted to use in connection with the driving and driven fly wheels of an engine and generator respectively, or of other similar mechanism. In machinery of this type, it is desirable to connect the driving and driven members together by means which have a certain degree of flexibility, whereby to admit of transmission of the rotating strains from one shaft to another, without depending upon accurate alinement of the shafts, and for compensation of any irregularities or inaccuracies as to mounting or setting of the mechanisms, alinement of the shafts, etc. It is also desirable to provide, in such coupling mechanism, provision for breakage under undue or excessive strains, so as to avoid breakage or rupture of any portions of the machines themselves.

With these ends in view, the invention, as disclosed, consists of a flexible link or arm, which is constructed in a particular manner, whereby to provide for the required strength and flexibility, with ample provision for wear at the points of attachment. The links, several of which are used, are constructed of a plurality of layers of any suitable material, as leather, rubber, etc., their end portions being reinforced and supplemented by metallic connecting terminals, as more fully hereinafter described.

In the drawings, Figure 1 is a view in elevation of the fly wheel of an engine, showing the relative arrangement of the connecting links connected with the driven wheel beyond. Fig. 2 is a transverse sectional view on the line II.—II. of Fig. 1, the section cutting through one of the link members. Fig. 3 is a perspective detail view, enlarged, of one of the link members. Fig. 4 is an enlarged central sectional view through one end portion of the link, indicated by the line IV.—IV. of Fig. 3.

In the drawings, the invention is shown as applied to a driving wheel 2 and a driven wheel 3, which may be the usual fly wheels of an engine and generator respectively, and which may be provided with the usual arms 4 and web or body portion 5, or otherwise, as desired.

For the purpose of providing for transmission of rotation from driving wheel 2 to wheel 3, I provide a series of connecting tension links 6, the end portions of which are attached to the arms 4 of wheel 2, and to the web 5 of wheel 3, or to lugs or bosses 7 thereon, respectively.

As shown, the end portions of the links are connected by bolts 8 and 9 respectively with these parts, said bolts being of any suitable construction, as tap bolts, through bolts, or studs, or the like. Each of the links 6 is composed of a plurality of longitudinal layers or strips 10, which, in the preferred construction, are of the best quality of belting leather, laid side by side in closely compacted arrangement, and preferably cemented together. Each of the strip sections 10 is in itself preferably composed of two integral layers of leather cemented together, with the hair side out and the body sides contacting, it being understood that to secure the highest degree of efficiency and endurance, the leather should be of selected quality. The end portions of the said members and the entire link are semi-circularly rounded, as indicated at 11, and an attaching eye for each end link is provided by a transverse thimble or bushing 12 extending from one side to the other and having riveted, soldered, or other suitable connection with the outer reinforcing plates 13, 13. These plates are fixedly connected together by a plurality of transverse rivets 14, whereby the entire structure is firmly embodied together. I thus provide reinforcing metallic attaching terminals for the links, which confine the end portions, strengthen and reinforce them, and provide metallic bearing portions for the studs or bolts 8 and 9 respectively. The metal used is preferably bronze, copper, or other suitable non-corrosive metal of good wearing quality and finish.

If desired, the several layers or strips 10, or the half portions thereof, may be left unconnected or uncemented between the endmost reinforcing plates 13, and only cemented at such end portions. By this construction an additional degree of flexibility of the link and its parts may be secured without in any way affecting its adaptability to the use intended. The leather body portion, being a non-conductor, effects complete insulation between the driving and driven machines, thereby avoiding the possibility of short circuiting, or other electrical connection.

The advantages of the device reside in its facility for use in the manner stated, allowing for a considerable degree of flexibility and buckling in the event of backlash, while being capable of imparting rotation at the commencement of the movement, without sudden strains or jars. The device is easily handled and applied; it may be readily substituted when broken; and it provides against the contingencies of unnecessary rupture or destruction incident to the use of slotted or single width links, while obviating the usual disadvantages of metallic springs or other connecting devices.

It will be understood that the device may be made in any suitable size, of sufficient strength to suit the size of the machines with which it is used, or otherwise changed or varied by the skilled mechanic in detail construction, but all such changes are to be considered as within the scope of the following claims.

What I claim is:

1. A connecting link for the purpose described consisting of a plurality of longitudinal flat strips of flexible material, reinforcing metallic end portions connected therewith, and bearing bushings extending through the ends of the strips and said end portions and fixedly connected therewith, substantially as set forth.

2. In a connecting link of the class described, the combination with a plurality of longitudinal layers of flexible material, of transverse metallic bushings extending through the ends thereof, face plates fixedly connected therewith and embracing the ends of the bushings and means extending bodily through the strips and connecting the strips and face plates closely together, substantially as set forth.

3. In a connecting link of the class described, the combination with a plurality of longitudinal layers of suitable material, of transverse cylindrical metallic bushings extending through the ends thereof and providing stud bearings, metallic face plates conforming to the outline of the strip sections at each end thereof and extending rearwardly of said bushings and fixedly connected therewith, and supplemental holding rivets extending through the sections and said face plates and fixedly connecting them and the sections closely together, substantially as set forth.

In testimony whereof I hereunto affix my signature in the presence of two witnesses.

EDWARD P. STACK.

Witnesses:
C. M. CLARKE,
FREDK. STAUB.

Copies of this patent may be obtained for five cents each, by addressing the "Commissioner of Patents, Washington, D. C."